July 10, 1928.

C. J. McDAVITT 1,676,911

SHINGLE GROUPING MACHINE

Filed Jan. 28, 1924

Inventor:
Charles J. McDavitt
By Gillson, Mann & Cox
Att'ys.

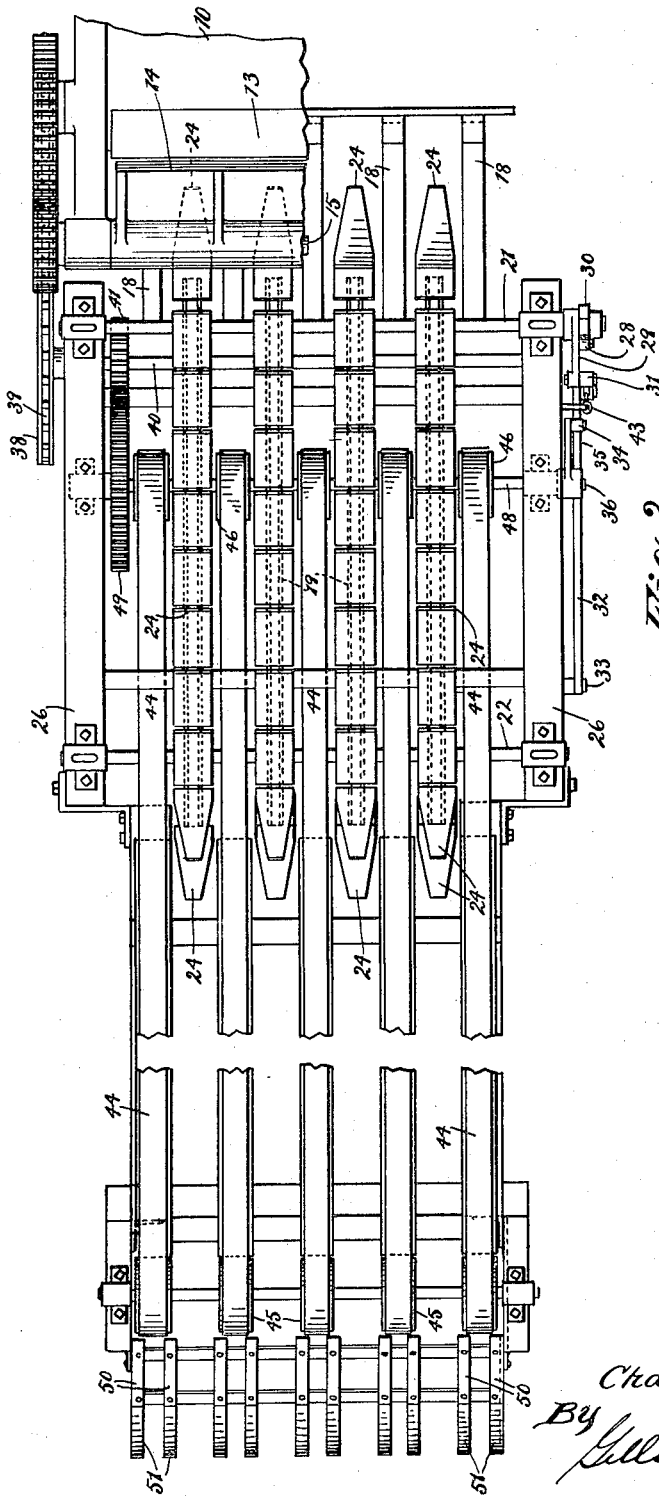

July 10, 1928.  1,676,911
C. J. McDAVITT
SHINGLE GROUPING MACHINE
Filed Jan. 28, 1924   3 Sheets-Sheet 3

Inventor:
Charles J. McDavitt
By Gillson Mann & Cox
Att'ys

Patented July 10, 1928.

1,676,911

UNITED STATES PATENT OFFICE.

CHARLES J. McDAVITT, OF CHICAGO, ILLINOIS, ASSIGNOR TO THE LEHON COMPANY, OF CHICAGO, ILLINOIS, A CORPORATION OF ILLINOIS.

SHINGLE-GROUPING MACHINE.

Application filed January 28, 1924. Serial No. 689,124.

This invention relates to the manufacture of prepared roofing in the form of shingles, shingle strips, and the like, and has for its principal object to collect them in groups of suitable number ready for bundling. A further object of the invention is to provide means for receiving shingles, shingle strips, and the like, one by one, or otherwise, as they come from a suitable source, such as a cutter and delivering them in potential bundles containing the same number ready for binding. Further objects and advantages of the invention will become apparent as the disclosure proceeds and the description is read in connection with the accompanying drawing illustrating selected embodiments of the invention, and in which:

Fig. 2 is a plan view of the same;

Figure 1:
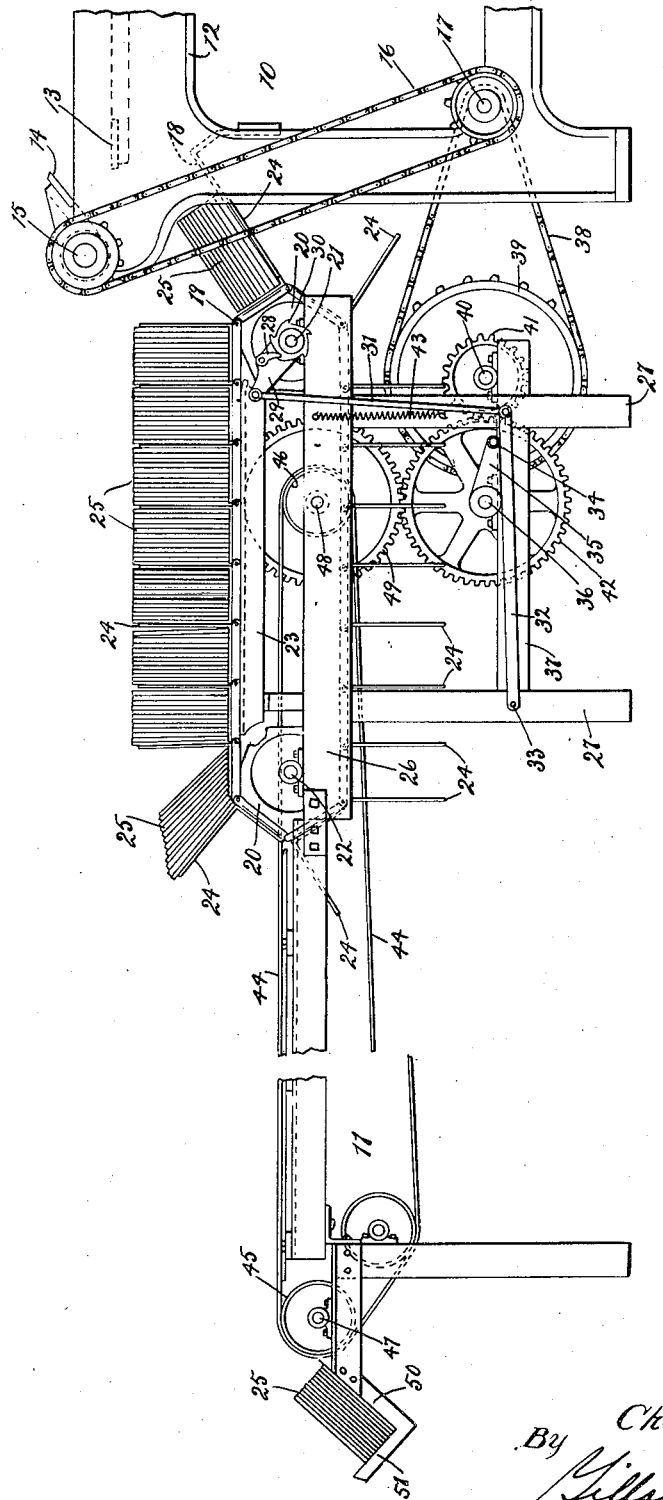
Fig. 1 is a side elevation of a preferred form shown associated with a conventional cutter and a conveyor for transporting the bundles.

In Fig. 1 the collecting and grouping device of the present invention is shown associated with and disposed between a source 10 of shingles, or shingle strips, here illustrated by a conventional form of cutter, and a conveyor 11 for transporting the groups, or potential bundles from the collecting and grouping device, to another department or building.

The cutter includes a frame 12 equipped with a fixed knife 13 cooperating with a revolving knife 14 carried by a shaft 15 and driven through a chain 16 from a suitable power shaft 17. The shingles, or shingle strips, fall, as a rule, one at a time on a rack or table 18.

The grouping device operates, when a suitable number has accumulated on the rack, to remove them and form them into a potential bundle. It includes a plurality of conveyor chains 19 carried by sprockets 20 on the shafts 21 and 22 and being supported between these sprockets by suitable rails 23. The chains are equipped with fingers 24, which pass through the rack 18, lift the group of shingles, such as illustrated at 25 therefrom and carry them to a suitable point of delivery, as in this instance, to the conveyor 11. The shafts 21 and 22 may be suitably mounted upon beams 26, carried by uprights 27, and the usual, or any desired, slack adjusting devices and appurtenances may be used.

The shaft 21, in this instance, is driven through a pawl 28, carried by a lever 29 and engaging with the teeth of the ratchet 30, fixed to the shaft. The free end of the lever 29 is pivoted to a connecting rod 31 which is also pivotally connected with a treadle 32, which rocks about a suitable hinge connection 33. The treadle lies in the path of a striker 34, carried by an arm 35, rotating with a shaft 36, which is suitably journaled upon a cross piece 37 attached to the uprights 27.

When the cutter delivers the shingles at a uniform rate, the grouping or counting may be easily accomplished by having the shaft 36 driven in a suitable ratio to the operation of the cutter. As illustrated a chain 38 driven by a sprocket on the shaft 17, drives a sprocket 39 on a counter shaft 40, which is equipped with a pinion 41, meshing with a gear 42, on the shaft 36. The shaft 17 makes a revolution with each operation of the cutter and the ratio here illustrated produces a downward movement of the treadle 32 and, therefore, an operation of the counting device at each twelve operations of the cutter. But obviously these conditions may be varied as desired.

With the arrangement shown the striker 34 comes in contact with the treadle 32 at a time when its movement is principally vertically downward and, therefore, gives a quick movement in starting the counting device or conveyor chains 19. But shortly after the operation is initiated the striker begins to move principally in a horizontal direction and, therefore, the movement communicated to the treadle is slow and slight. As a result the fingers 24 are operated quickly to move a potential bundle 25 away from the rack 18 and then slow up so as to deliver another potential bundle 25 to the conveyor 11 slowly and easily, and thereby prevent scattering the individual members of the group.

Any suitable means may be provided to raise the treadle when the striker 34 moves upwardly, as, for example, a spring 43 may extend between the moving end of the treadle and beams 26.

The conveyor 11 is here shown as including a plurality of belts 44 running over pulleys 45 and 46, carried by shafts 47 and 48 respectively. The shaft 48 may be driven through a gear 49 meshing with the gear 42 and thereby receive continuous movement from the source in the shaft 17.

This conveyor may be used or not, depending upon the location of the bundling department with respect to the source of shingles or shingle strips. It will be found convenient to have this conveyor, or other device, used to transport the potential bundles, deliver to an inclined rack 50 having a base 51 substantially at right angles thereto, for in this way the potential bundle falling against the base 51 will have the individual shingles or shingle strips brought into alignment and practically in condition for binding. When no conveyor 11, or the like, is used the fingers 24 may be made to deliver to a similar rack.

When the counting and grouping device is used, as here shown in connection with a cutter, it serves also as a cooling rack that permits the shingles to reach a proper temperature for binding before they are delivered to the binder. Also an attendant standing by the machine has ample time to remove any "seconds" and replace them with "firsts" to the end that the potential bundles may contain the proper number of perfect shingles or shingle strips.

Figure 3:
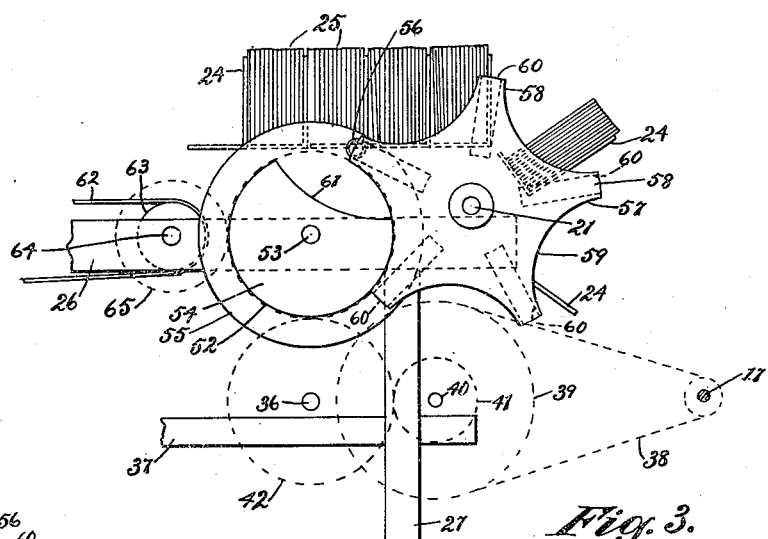
Fig. 3 is a fragmentary view illustrating a modified form of driving means.
Figure 4:
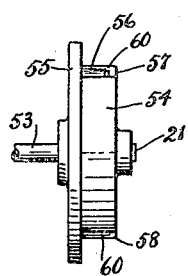
Fig. 4 is a fragmentary detail giving a different view of the driving means.

In Figs. 3 and 4 there is shown a modified form of the driving means, embodying what is sometimes called the Geneva movement. The gear 42 meshes with a gear 52 on a shaft 53 which carries a drum 54 having a flange 55 equipped with a driving pin 56. The shaft 21 is equipped with a star-shaped member 57 having, in this instance, five arms 58 separated by curved portions 59 and provided with slots 60 adapted to receive the pin 56. The curved portions 59 correspond to the surface of the drum 54 and cooperate with it to hold the shaft 21 against movement except when the pin 56 is operatively associated with one of the slots 60. The drum is cut away as indicated by the curved line 61 to accommodate the arms 58 in their rotation.

In this instance the conveyor which receives the potential groups may include a belt 62 driven by a pulley 63 on a shaft 64 which also has a gear 65 meshing with the gear 52.

Figure 5:
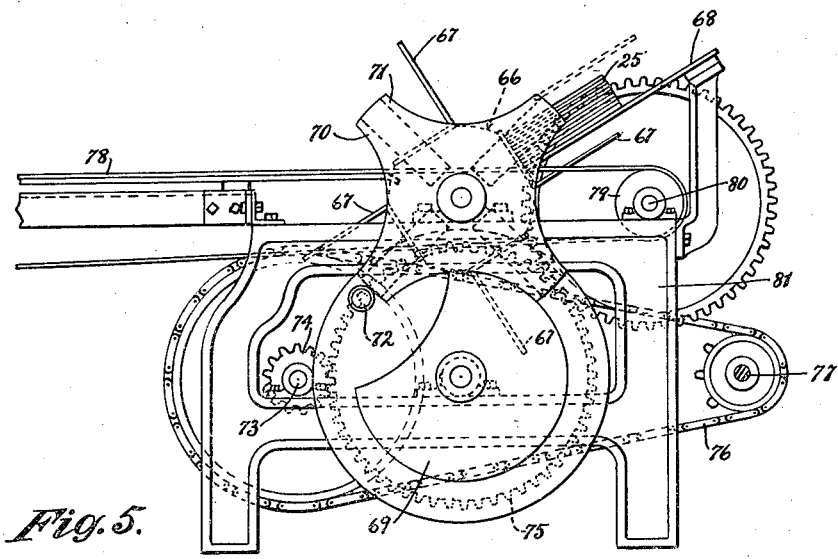
Fig. 5 is a side elevation illustrating a further modified form.

In Fig. 5 there is shown a further modified form in which the conveying device that removes the group shingles is in the form of a drum 66 equipped with fingers 67 which pass through the rack 68 and lift the shingles therefrom in much the same manner as in the earlier forms described. The drum may be driven in any suitable way and is here shown as equipped with a Geneva movement including the drum 69 and the star-shaped wheel 70, having four slotted arms 71 for cooperation with the driving pin 72, carried by the drum 69. The latter receives power from a shaft 73 through a pinion 74 and a gear 75; and this shaft is driven through a sprocket chain 76 from any suitable source of power. When this device is used in connection with a cutter the rack 68 may correspond to the rack 18, shown in Fig. 1, and the chain 76 may receive power from the shaft 77, corresponding to the shaft 17.

If the counting device is to deliver to a conveyor it may include a belt 78 driven by a pulley 79, on a shaft 80, carried by the frame 81, or otherwise, as desired.

This modified form is somewhat cheaper to construct and maintain and where suitable will, therefore, be found preferable to the chain conveyor type.

From the foregoing it will be seen that I have provided a device for grouping shingles, shingle strips and the like into potential bundles that will effect a great saving in the manufacture of these articles. No matter how rapid the shingles or shingle strips are made, this device will group them into potential bundles of suitable number and deliver them ready for binding at any suitable point with relation to the source. At the same time there is afforded ample opportunity for inspection and cooling and other desirable operations.

In this disclosure use has been made of drawings and description to make the invention understood, but I do not wish to be limited to anything contained therein, or otherwise, except as is made necessary by the prior art.

I claim as my invention:

1. In a shingle machine, the combination of a rack having an inclined base whereby shingles received successively will accumulate with corresponding edges substantially parallel, means for feeding shingles edgewise and successively to the base of the rack, a collecting device adapted to remove shingles from the rack in groups and including lifting means moving transversely to the inclined base, and means for driving the collecting device intermittently.

2. In a shingle machine, a source of shingles delivered successively, a rack disposed to receive shingles from the source and including oppositely inclined members whereby the shingles are caused to accumulate with a corresponding edge of each shingle against one of the inclined members, a collecting device including fingers adapted to move transversely to the last mentioned inclined member, and means for intermittently driving the collecting device.

3. In a shingle machine, a source of shingles delivered successively, a rack disposed to receive shingles from the source and including oppositely inclined members whereby the shingles are caused to accumulate with a corresponding edge of each shingle against one of the inclined members, a collecting device including fingers adapted to move transversely to the last mentioned inclined member, and means for driving the collecting device with a periodic quick movement.

4. In a shingle machine, means for delivering shingles successively, means for grouping the delivered shingles including oppositely inclined members forming a trough-like rack opening upwardly whereby the shingles accumulate in substantially parallel relation, each leaning against the shingle beneath, a collecting device including fingers moving transversely to the rack to lift the shingles therefrom in groups, and means for intermittently driving the collecting device.

5. In a shingle machine, means for delivering shingles successively and means for grouping the shingles including oppositely inclined members forming a trough-like rack opening upwardly whereby the shingles accumulate in substantially parallel relation, each leaning against the shingle beneath, a collecting device including fingers moving transversely to the rack to lift the shingles therefrom in groups and means for driving the collecting device intermittently with a quick start followed by gradual deceleration.

6. In a shingle machine, means for delivering shingles successively, means for grouping the delivered shingles including a rack on which the shingles fall and having a limiting device for engaging the front edge of the shingles to arrest their movement whereby they are grouped with the forward edges in substantially the same plane, a collecting device including means moving transversely to the limiting device to remove the shingles in groups, and means for driving the collecting device intermittently.

7. In a shingle machine, means for delivering shingles successively and means for grouping the shingles including a rack on which the shingles fall and having a limiting device for engaging the front edge of the shingles to arrest their movement whereby they are grouped with the forward edges in substantially the same plane, a collecting device including spaced sets of fingers traveling in a circuit and moving transversely to the rack to lift the fingers from it in groups and means for driving the collecting device intermittently with quick movement during the lifting of the shingles from the rack.

8. In a shingle machine, means for delivering shingles successively, means for grouping the delivered shingles including a rack on which the shingles fall and having a limiting device for engaging the front edge of the shingles to arrest their movement whereby they are grouped with the forward edges in substantially the same plane, a collecting device including an endless conveyor traveling about an elongated circuit substantially flat on its upper side and separated sets of lifting devices carried by the conveyor and moving transversely to the rack in approaching the flat upper side of the circuit whereby the shingles are lifted from the rack in groups and carried along the flat portion of the circuit to permit inspection, and means for intermittently driving the conveyor.

9. In a shingle machine, means for delivering shingles successively and means for grouping the shingles including a rack on which the shingles fall and having a limiting device for engaging the front edge of the shingles to arrest their movement whereby they are grouped with the forward edges in substantially the same plane, a collecting device including an endless conveyor traveling about an elongated circuit substantially flat on its upper side and separated sets of lifting devices carried by the conveyor and moving transversely to the rack in approaching the flat upper side of the circuit whereby the shingles are lifted from the rack in groups and carried along the flat portion of the circuit to permit inspection, and means for driving the conveyor with a quick movement as the groups are removed from the rack.

10. In a device of the character described, the combination with a stationary rack to receive and accumulate members successively thereon, means for successively feeding articles to the rack for accumulation thereon, a conveyor provided with a succession of conveyor fingers for removing an accumulation of articles from the rack, the rack being slotted to permit of the passage of the conveyor fingers therethrough, and means for imparting a step by step movement to the conveyor correlated with the article feeding means to move a conveyor finger through the rack when a predetermined number of articles have been fed to and accumulated thereon.

CHARLES J. McDAVITT.